US006823066B1

(12) United States Patent
Tuttle et al.

(10) Patent No.: US 6,823,066 B1
(45) Date of Patent: Nov. 23, 2004

(54) DIGITAL ACCESS ARRANGEMENT CIRCUITRY AND METHOD HAVING CURRENT RAMPING CONTROL OF THE HOOKSWITCH

(75) Inventors: George Tyson Tuttle, Austin, TX (US); Jeffrey W. Scott, Austin, TX (US); Navdeep S. Sooch, Austin, TX (US); David R. Welland, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 09/347,689

(22) Filed: Jul. 2, 1999

Related U.S. Application Data

(63) Continuation-in-part of application No. 09/098,489, filed on Jun. 16, 1998, and a continuation-in-part of application No. 09/035,779, filed on Mar. 4, 1998, and a continuation-in-part of application No. 09/035,175, filed on Mar. 4, 1998, and a continuation-in-part of application No. 09/034,620, filed on Mar. 4, 1998, and a continuation-in-part of application No. 09/034,455, filed on Mar. 4, 1998, and a continuation-in-part of application No. 08/841,409, filed on Apr. 22, 1997, and a continuation-in-part of application No. 08/837,714, filed on Apr. 22, 1997, and a continuation-in-part of application No. 08/837,702, filed on Apr. 22, 1997, now Pat. No. 5,870,046.

(51) Int. Cl.$^7$ ............................. H04M 1/00; H04M 9/00
(52) U.S. Cl. ............................. 379/399.01; 379/399.02; 379/400; 379/401; 379/402; 379/403; 379/404; 379/405; 379/412; 379/413; 379/413.01; 379/413.02; 379/413.03; 379/413.04
(58) Field of Search ......................... 379/399.01–399.02

(56) References Cited

U.S. PATENT DOCUMENTS

| | | | | |
|---|---|---|---|---|
| 4,815,126 | A | * | 3/1989 | Goode et al. |
| 5,500,895 | A | * | 3/1996 | Yurgelites |
| 5,654,984 | A | * | 8/1997 | Hershbarger et al. |
| 5,714,809 | A | * | 2/1998 | Clemo |
| 5,801,517 | A | * | 9/1998 | Borle |

OTHER PUBLICATIONS

Information Sheet—*Siemens, ICs for Communications, ALIS Reference Board*, SIPB 4595 Version 1.0, Technical Description 06.97, Q67220–H1014, Jun. 1997.
Information Sheet—*Siemens, ICs for Communications, ALIS Evaluation Board*, SIPB 45900 Version 1.1, Technical Description 06.97, Q67220–H1047, Jun. 1997.
Information Sheet—*Siemens, ALIS—Development Tools Evaluation Board*, pp. 1–3, Jul. 21, 1997.
Information Sheet—*Siemens, ICs for Communications Analog Network Interface Circuit ANIC*, PSB 4450 Version 1.1 and PSB 4451 Version 1.1, Preliminary Data Sheet 02.99 (Feb. 1999).
SmartMC Modem Codec, *Host–Processed, V.90/K56flex Modem Codec (C) Device Set with SmartDAA Technology for AC–Link (AC'97 2.1) Applications*, Data Sheet (Mar. 12, 1999).

* cited by examiner

Primary Examiner—Forester W. Isen
Assistant Examiner—Ramnandan Singh
(74) Attorney, Agent, or Firm—O'Keefe, Egan & Peterman, LLP

(57) ABSTRACT

A digital direct access arrangement (DAA) circuitry may be used to terminate the telephone connections at the user's end to provide a communication path for signals to and from the phone lines. Briefly described, a means for providing a proper hookswitch transition for a variety of international phone standards is provided. The invention may also be utilized with means for transmitting and receiving a signal across a capacitive isolation barrier. More particularly, a DAA circuitry may be utilized which satisfies many or all hookswitch transition standards without the use of additional discrete devices. The hookswitch transition standards may be satisfied by ramping down the current flowing through the hookswitch prior to transitioning the hookswitch state. In this manner the hookswitch current change as a function of time (di/dt) may be decreased. Thus, the current through the hookswitch may be actively controlled prior to switching the hookswitch from an off-hook condition to an on-hook condition. By controlling the current drawn from the phone lines through the hookswitch, the maximum voltage seen at the phone company exchange may be decreased.

29 Claims, 15 Drawing Sheets

US 6,823,066 B1

DIGITAL ACCESS ARRANGEMENT CIRCUITRY AND METHOD HAVING CURRENT RAMPING CONTROL OF THE HOOKSWITCH

This application is a continuation-in-part application of U.S. Ser. Nos. 08/841,409, 08/837,702, now U.S. Pat. No. 5,870,046 and Ser. No. 08/837,714 all filed on Apr. 22, 1997; and a continuation-in-part application of U.S. Ser. Nos. 09/034,455, 09/035,779, 09/034,620, and 09/035,175 all filed on Mar. 4, 1998; and a continuation-in-part application of U.S. Ser. No. 09/098,489 filed on Jun. 16, 1998, all of which are expressly incorporated herein by reference.

TECHNICAL FIELD OF THE INVENTION

This invention relates to the field of digital access arrangement circuitry. More particularly, this invention relates to digital access arrangement circuitry for connecting to a variety of phone line standards. The digital access arrangement circuitry may further include isolation barrier utilizing a capacitor coupled isolation barrier.

BACKGROUND

Direct Access Arrangement (DAA) circuitry be used to terminate the telephone connections at a phone line user's end to provide a communication path for signals to and from the phone lines. DAA circuitry includes the necessary circuitry to terminate the telephone connections at the user's end and may include, for example, an isolation barrier, DC termination circuitry, AC termination circuitry, ring detection circuitry, and processing circuitry that provides a communication path for signals to and from the phone lines.

Generally, governmental regulations specify the telephone interface requirements and specifications for a variety of parameters including pulse dialing transitions, spark quenching, AC termination, DC termination, ringer impedance, ringer threshold, etc. For example, Federal Communications Commission (FCC) Part 68 governs the interface requirements for telephones in the United States. However, the interface requirements world wide are not standardized, and thus, in countries other than the United States the applicable standards may include the CTR21, TBR21, NET4, JATE, and various country specific PTT specifications. Because the interface requirements are not standardized from country to country, often different DAA circuitry is required for use in each country in order to comply with the appropriate standard. The requirement for different DAA circuitry, however, limits the use of one phone line interface in a variety of countries. Thus, for example, a modem in a laptop computer configured for interfacing with a phone line in one country may not necessarily operate properly in another country. Further, the requirement for different DAA circuitry in various countries hinders the design of a single integrated cost effective DAA solution for use world wide.

As mentioned above, the telephone interface requirements generally include specifications for the pulse dialing (also called decadic dialing) transitions and spark quenching presented to the telephone line. In general, pulse dialing comprises a repetitive series of on-hook and off-hook transitions. FIG. 1 shows the standard two-wire public network lines, the TIP line 8 and the RING line 6. The TIP line and the RING line may be conventionally connected to a diode bridge 11. The diode bridge presents the proper polarity line signal to the hookswitch circuit 12 independent of the TIP and RING polarity. The hookswitch circuit 12 operates as a switch to "seize" or "collapse" the TIP and RING phone lines to allow the maximum loop current ($I_{loop}$) that is available from the phone line to flow. In an on-hook condition (i.e. the user is not transmitting data to or from the phone line), the hookswitch circuit 12 may be switched open. In an off-hook condition, the hookswitch circuit 12 may be switched closed to allow a loop current flow $I_{LOOP}$. The remaining DAA circuitry is shown as block 10. The phone company exchange is connected to the other side of the TIP and RING lines and may be characterized as a voltage source 16, an inductor 14 have an inductance L and a resistor 13. As the hookswitch opens and closest the loop current flow $I_{LOOP}$ will change and the voltage across the inductor 14 will change.

FIG. 1A illustrates the voltage across the inductor as the state of the hookswitch changes. FIG. 1A shows an exemplary series of hookswitch transitions. Such a series of transitions may be seen at a period of 100 msec, for example, during pulse dialing. It will be noted that the voltage across the inductor spikes as shown by dashed lines 22 during transitions from an off-hook condition to an on-hook condition (i.e. the loop current $I_{LOOP}$ transitions from a steady state off-hook value to zero). The voltage spike 22 results from the inductor V-I relationship $V=L(di/dt)$ that results since the phone company exchange is characterized as an inductive source. If the loop current suddenly drops, large voltage spike will occur across the effective inductance of the phone company exchange, and thus, across the TIP and RING lines. The maximum inductor voltage is specified in various countries and is sometimes referred to as the "spark quenching" specification. For example, in Australia (one of the more demanding specifications), the line inductance is specified as 4H and voltage across such an inductance may not exceed 230V. These voltage spikes may also result in undesirable voltage sparks across the hookswitch.

In addition to the spark quenching specifications, for pulse dialing some countries have specifications which require the transition from off-hook to on-hook to occur slowly. Thus, another country dependent specification exists which may require the hookswitch transition to be controlled.

One prior art approach to limit the instantaneous current change which occurs when the hookswitch is changed from off-hook to on-hook is shown in FIG. 1B. As shown in FIG. 1B, a resistor 32 and capacitor 30 are provided around the hookswitch circuit 12. The purpose of the resistor 32 and capacitor 30 is to provide a current path around the hookswitch when the hookswitch is opened. The RC effect of the resistor 32 and capacitor 30 is to slow the current change from the steady state off-hook value to the on-hook zero value. Thus, the di/dt term will be decreased and the maximum voltage seen across the inductor will drop since the spike 22 will decrease. Other prior a approaches may include the use of a voltage clamp (such as an MOV device) placed across the TIP and RING lines. The use of these additional discrete external devices add to the DAA system costs and complexity.

It is desirable, therefore, to provide a DAA circuitry that may be suitable for use in many or all countries without the need for use of additional external discrete devices to satisfy off-hook and on-hook transition standards.

Further, it is also desirable that the DAA circuitry act as an isolation barrier since an electrical isolation barrier must exist in communication circuitry which connects directly to the stanrdard two-wire public switched telephone network and that is powered through a standard residential wall outlet. For example, in order to achieve regulatory compliance in the United States with Federal Communications Commission Part 68, which governs electrical corrections to the telephone network in order to prevent network harm, an isolation barrier capable of withstanding 1000 volts rms at 60 Hz with no more than 10 milliamps current flow, must exist between circuitry directly connected to the two wire telephone network and circuitry directly connected to the residential wall outlet.

Thus, there exists a need for reliable, accurate and inexpensive DAA circuitry for satisfying the hookswitch transition standards for multiple county phone line standards and a DAA circuitry which also provides the necessary electrical isolation barrier.

SUMMARY OF THE INVENTION

The above-referenced problems are addressed by the present invention, which provides a reliable, inexpensive, DAA circuit that may be utilized with multiple telephone interface standards and which also provides an isolation system that is substantially immune to noise that affects the timing and/or amplitude of the signal that is transmitted across the isolating element, thus permitting an input signal to be accurately reproduced at the output of the isolation system.

The present invention provides digital direct access arrangement (DAA) circuitry that may be used to terminate the telephone connections at the user's end to provide a communication path for signals to and from the phone lines. Briefly described, the invention provides a means for providing a proper hookswitch transition for a variety of international phone standards. The invention may also be utilized with means for transmitting and receiving a signal across a capacitive isolation barrier. More particularly, a DAA circuitry may be utilized which satisfies many or all hookswitch transition standards without the use of additional discrete devices. The hookswitch transition standards may be satisfied by ramping down the current flowing through the hookswitch prior to transitioning the hookswitch state. In this manner the hookswitch current change as a function of time (di/dt) may be decreased. Thus, the current through the hookswitch may be actively controlled prior to switching the hookswitch from an off-hook condition to an on-hook condition. By controlling the current drawn from the phone lines through the hookswitch, the maximum voltage seen at the phone company exchange may be decreased.

In one embodiment, a communication system is provided. The communication system may comprise phone line side circuitry that may be coupled to phone lines and powered side circuitry that may be coupled to the phone line side circuitry through an isolation barrier. The communication system may further include a hookswitch transition signal, and current ramping circuitry coupled to the hookswitch transition signal within the phone line side circuitry, the current ramping circuitry ramping downward the current drawn from the phone line in response to the hookswitch transition signal prior to the hookswitch completely changing states.

In another embodiment, a method of operating a communication system that may be coupled to a phone line is provided. The method may include coupling an isolation barrier between powered circuitry and phone line side circuitry, drawing current at a first current level from the phone line through the hookswitch circuitry, providing hookswitch circuitry within the phone line side circuitry, and decreasing the current drawn through the hookswitch to a second level prior to changing the hookswitch from an off-hook state to an on-hook state, the second current level being less than the first current level.

In yet another embodiment, a hookswitch transition circuit within a communication system that may be connected to phone lines is provided. The hookswitch transition circuit may comprise a hookswitch control signal, and at least one variable current circuit coupled to the hookswitch control signal, the at least one variable current circuit responsive to the hookswitch control signal to decrease a current drawn from the phone lines prior to changing the state of a hookswitch.

In another embodiment, a method of controlling the current change in phone line side circuitry is provided. The method includes providing a signal indicative of a desire to change a hookswitch from an off-hook state to an on-hook state, and adjusting downward the current drawn from a phone line in response to the signal prior to changing the hookswitch from the off-hook state to the on hook state.

A method of controlling current in a phone line is also provided in another embodiment. The method may include actively controlling at least one current circuit of a DAA integrated circuit in response to a hookswitch transition signal, and substantially decreasing the current in the phone line as a result of the active control prior to achieving an on-hook state.

An integrated circuit compatible with a plurality of phone line standards having hookswitch transition requirements is also provided. The integrated circuit may include a hookswitch signal, and at least one current control circuit coupled to the hookwitch signal, the current control circuit coupled to at least one output of the integrated circuit, the current control circuit operating prior to the completion of a hookswitch transition to enable a decrease in a current level on the phone.

DESCRIPTION OF THE DRAWINGS

So that the manner in which the herein described advantages and features of the present invention, as well as others which will become apparent, are attained and can be understood in detail, a more particular description of the invention summarized above may be had by reference to the embodiments thereof which are illustrated in the appended drawings, which drawings form a part of this specification.

It is noted, however, that the appended drawings illustrate only exemplary embodiments of the invention and are therefore not to be considered limiting of its scope, for the invention may admit to other equally effective embodiments.

DESCRIPTION OF PREFERRED EMBODIMENTS

Figure 1:
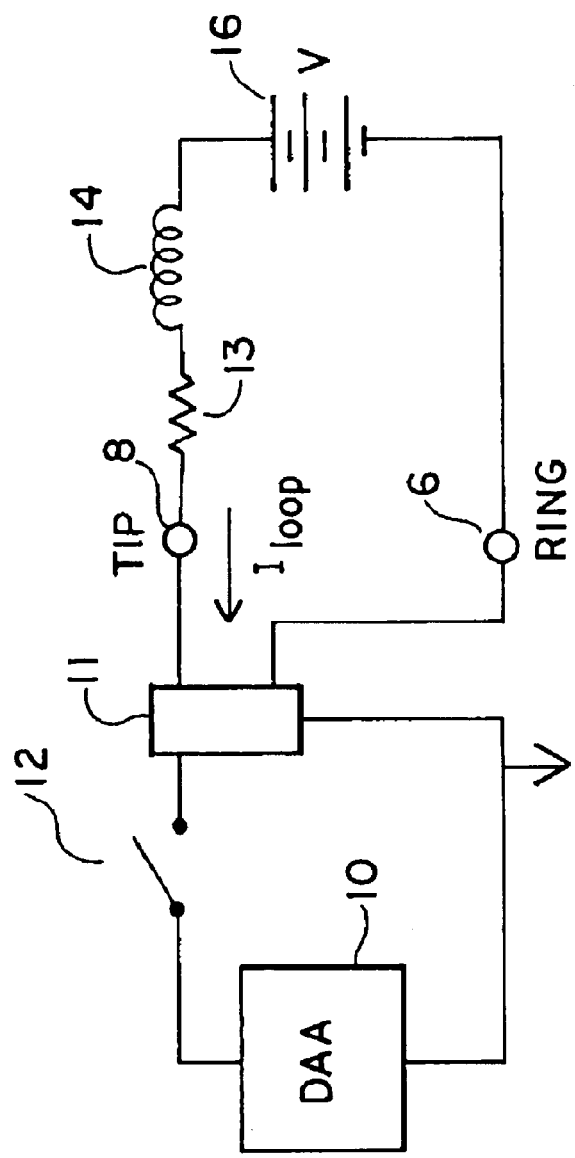
FIG. 1 is a general schematic illustrating a hookswitch coupled to a phone company exchange and additional DAA circuitry.
Figure 1A:
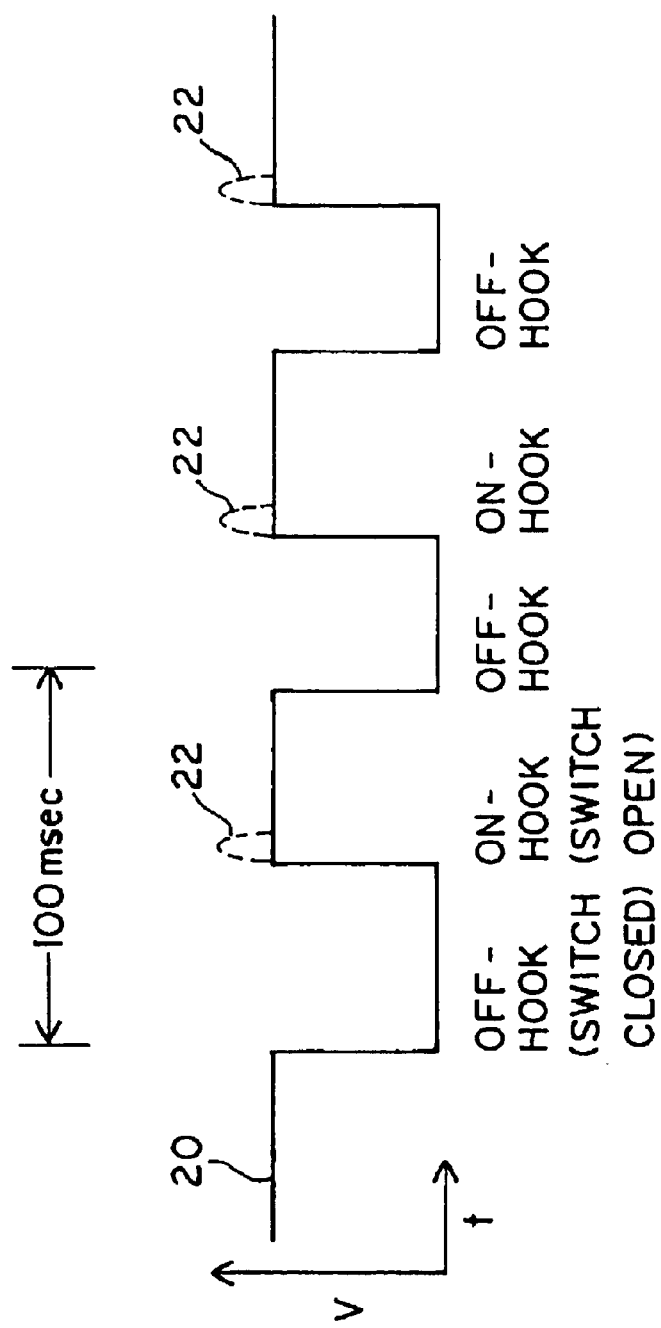
FIG. 1A illustrates the voltage seen during hookswitch transitions.
Figure 1B:
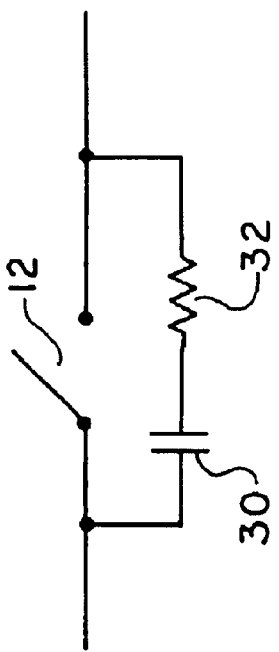
FIG. 1B illustrates one prior art approach to limit voltage spikes or sparks.
Figure 2:
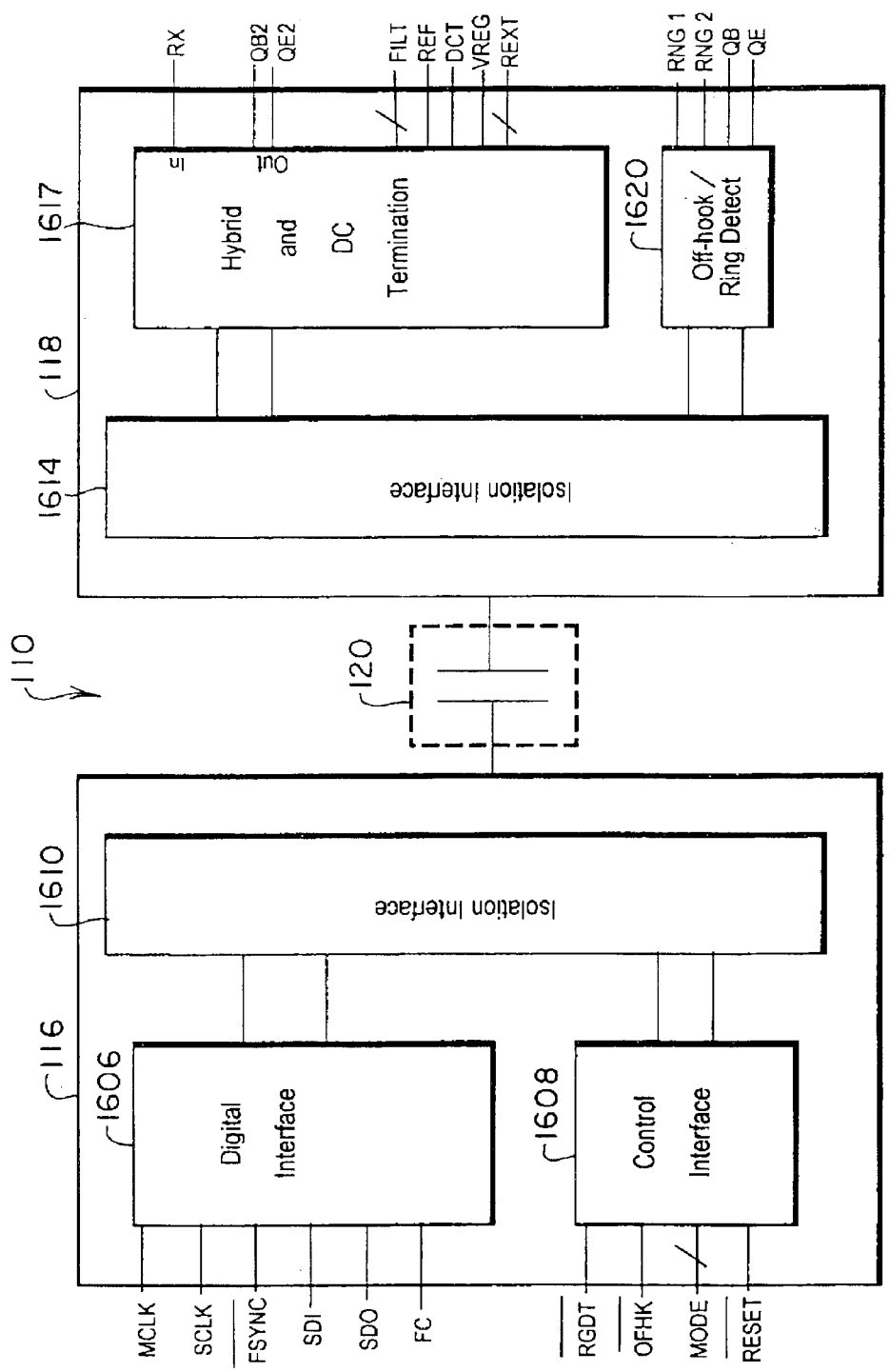
FIG. 2 is a general block diagram of digital DAA circuitry including phone line side circuitry, an isolation barrier, and powered side circuitry according to the present invention.
Figure 2A:
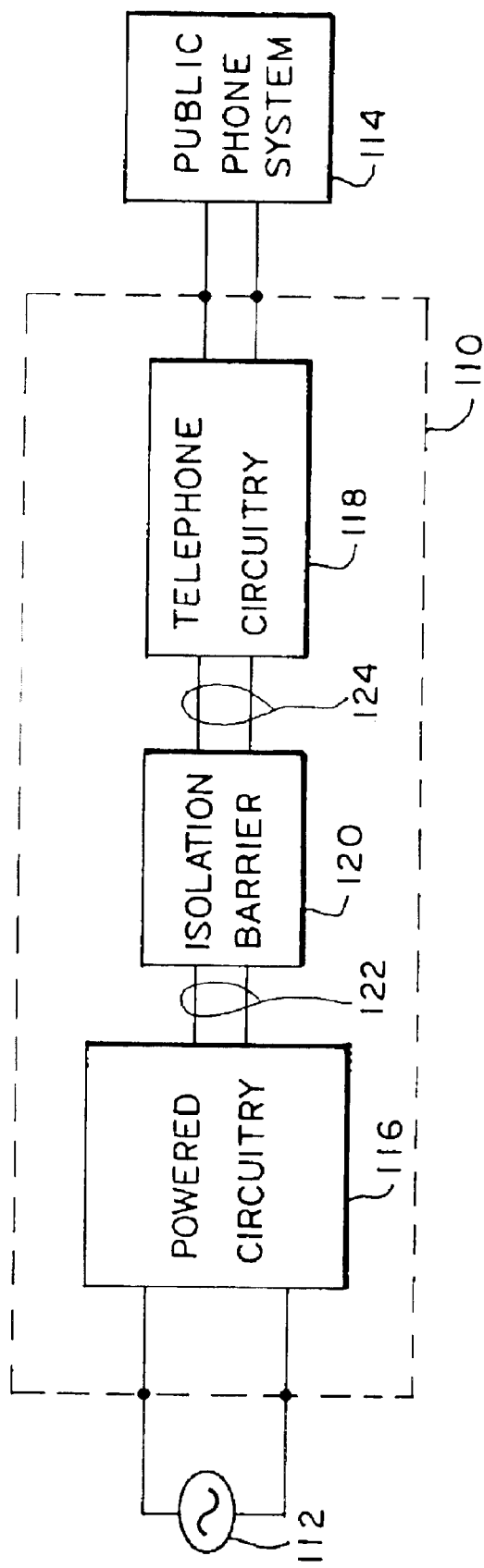
FIG. 2A is a block diagram of a telephone set illustrating a typical application of the present invention.

In order to provide a context for understanding this description, FIG. 2A illustrates a typical application for the present invention: a telephone that includes circuitry powered by a source external to the phone system. A basic telephone circuit 118 is powered by the "battery" voltage that is provided by the public telephone system and does not have a separate power connection. Many modern phones 110, however, include radio (cordless), speakerphone, or answering machine features that an external source of power 112, typically obtained by plugging, the phone (or a power supply transformer rectifier) into a typical 110-volt residential wall outlet. In order to protect public phone system 114 (and to comply with governmental regulations), it is necessary to isolate "powered circuitry"116 that is externally powered from "isolated circuitry"118 (isolated circuitry may also be called phone line side circuitry) that is connected to the phone lines, to prevent dangerous or destructive voltage or current levels from entering the phone system. (Similar considerations exist in many other applications as well, including communication, medical and instrumentation applications in which this invention may be beneficially applied.) The required isolation is provided by isolation barrier 120. The signal that passes through the isolation barrier 120 is an analog voice signal in a typical telephone application, but it may also be a digital signal or a multiplexed signal with both analog and digital components in various applications. In some applications, communication across isolation barrier 120 may be unidirectional (in either direction), but in many applications, including, telephony, bidirectional communication is required. Bidirectional communication may be provided using a pair of unidirectional isolator channels, or by forming a single isolation channel and multiplexing bidirectional signals through the channel. The primary requirements placed on isolation barrier 120 are that it effectively prevents harmful levels of electrical power from passing across it, while accurately passing the desired signal from the powered side 122 to the isolated side 124, or in the reverse direction if desired.

FIG. 2 is a general block diagram of digital DAA circuitry 110 including phone line side circuitry 118, an isolation barrier 120, and powered side circuitry 116 according to the present invention. The isolation barrier 120 may include one or more capacitors and allow for the transmission of digital information between the isolation interface 1614 in the phone line side circuitry and the isolation interface 1610 in the powered side circuitry. The phone line side circuitry 118 may be connected to phone lines of a telephone network system, and the powered side circuitry 116 may be connected to external controllers, such as digital signal processors (DSP), that may be part of a communication device, such as a phone or modem.

The powered side circuitry 116, which may be implemented as an integrated circuit (IC), may communicate with the external controller through a digital interface 1606 and a control interface 1608. For example, the digital interface 1606 may have a number of external pins providing a serial port interface to the external controller, such as a master clock input pin (MCLK), a serial port bit clock output (SCLK), a serial port data IN pin (SDI), a serial port data OUT pin (SDO), a frame sync output pin (FSYNC_bar) (it is noted that the suffix "_bar" is used to denote a signal that is typically asserted when at a low logic level), and a secondary transfer request input pin (FC). Similarly, the control interface 1608 may have a number of external pins providing control and status information to and from the external controller, such as a ring detect status pin (RGDT_bar), an off-hook status pin (OFHK_bar), a reset pin (RESET_bar), and multiple mode select pins (MODE). In addition, the digital interface 1606 and the control interface 1608 are connected to the isolation interface 1610 so that control, status, signal and other desired information may be transmitted to, and received from the phone line side circuitry 118 across the isolation barrier 120.

The phone line side circuitry 118, which may be implemented as an integrated circuit (IC), may communicate with the phone lines through hybrid and DC termination circuitry 1617 (the DC termination circuitry provides an internal power supply voltage), and determine ring-detect and off-hook status information through off-hook/ring-detect block 1620. In addition, the hybrid and DIC termination circuitry 1617 and the off-hook/ring-detect block 1620 are connected to the isolation interface 1614 so that control, status, signal and other desired information may be transmitted to and received from the powered side circuitry 116 across the isolation barrier 120.

In the embodiment depicted, the hybrid portion of the hybrid and DC termination circuitry 1617 has an output pin QE2 and an input pin (RX) that may connect to external telephone interface circuitry such as hook-switch circuitry and a diode bridge. The hybrid circuitry may function to split the differential signal existing on the phone, which typically includes both transmit and receive analog information, into an internal transmit signal ($TX_{INT}$) and receive signal ($RX_{INT}$). It is noted that the QE2 output pin is used to transmit analog information to the phone lines, and that the RX pin is labeled to indicate that it is used to receive analog information from the phone lines. These external pin signals are different than the internal analog transmit signal ($TX_{INT}$) and analog receive signal ($RX_{INT}$).

Figure 4A:
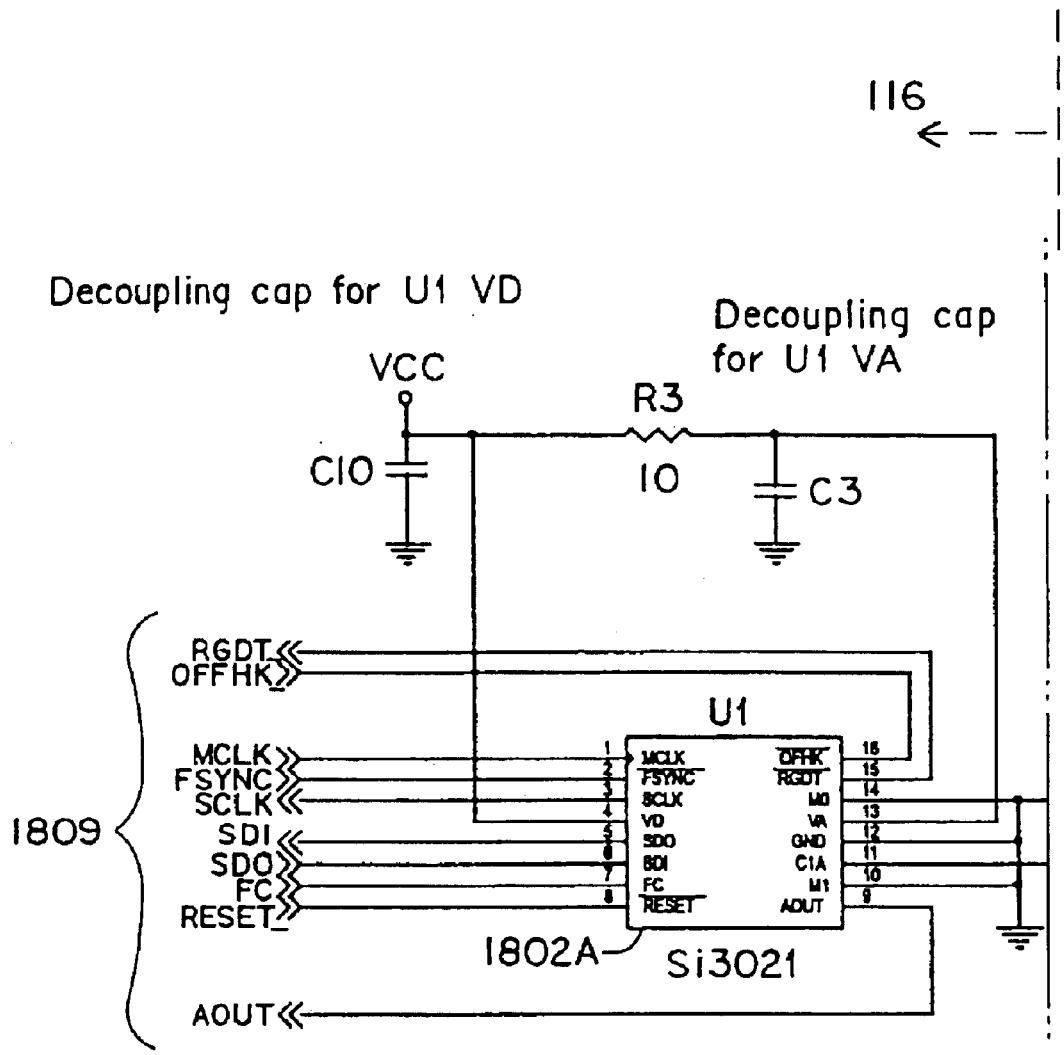
FIGS. 4A, 4B and 4C are general circuit diagrams of digital DAA circuitry implemented with two integrated circuits (ICs), a capacitive isolation barrier, and external circuitry according to the present invention.
Figure 4:
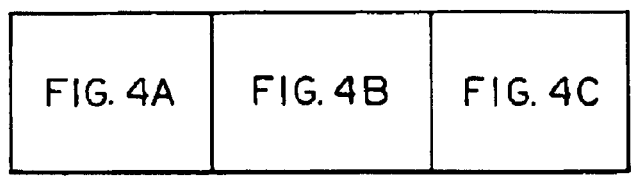
Figure 4B:
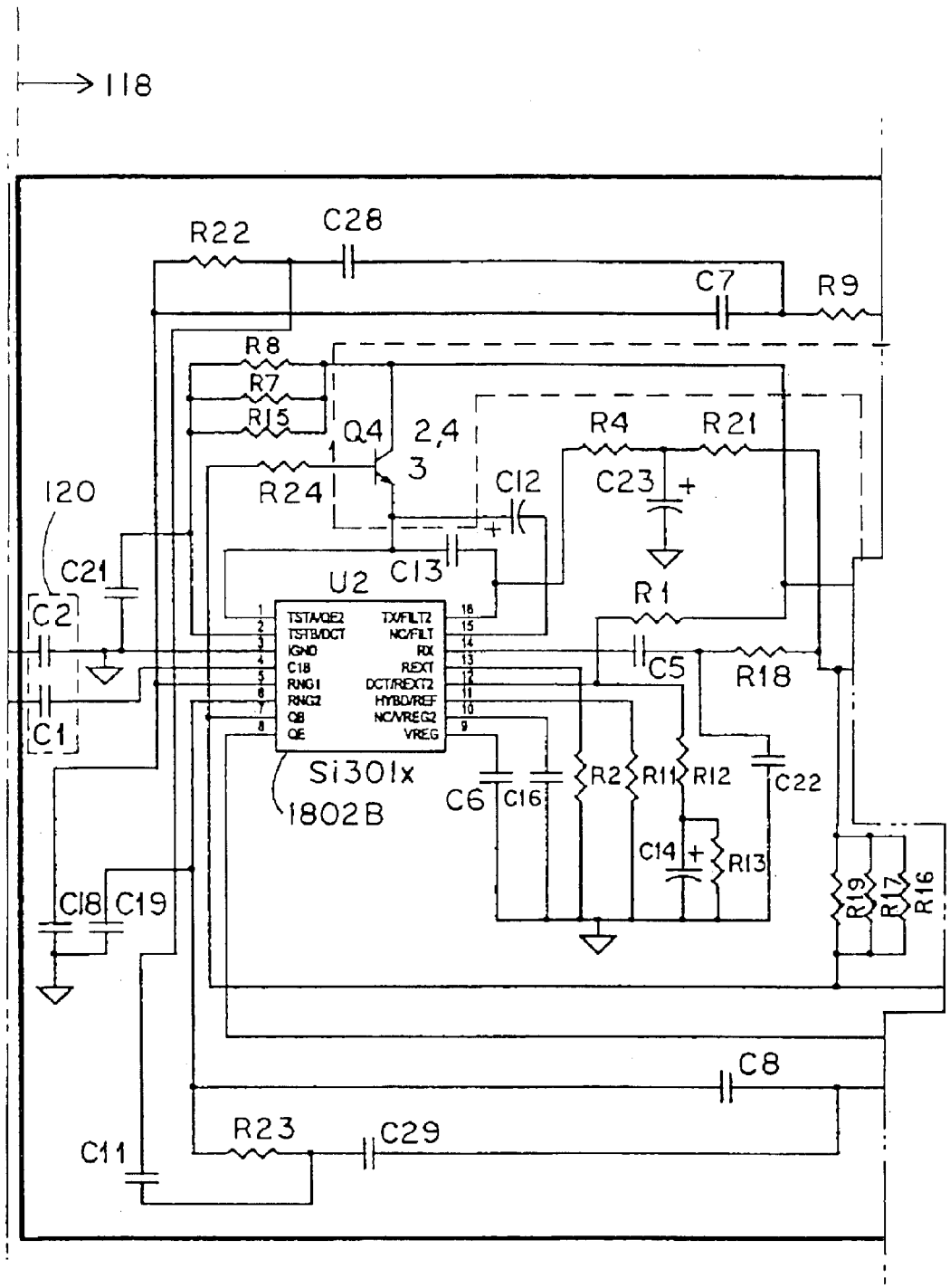
Figure 4C:
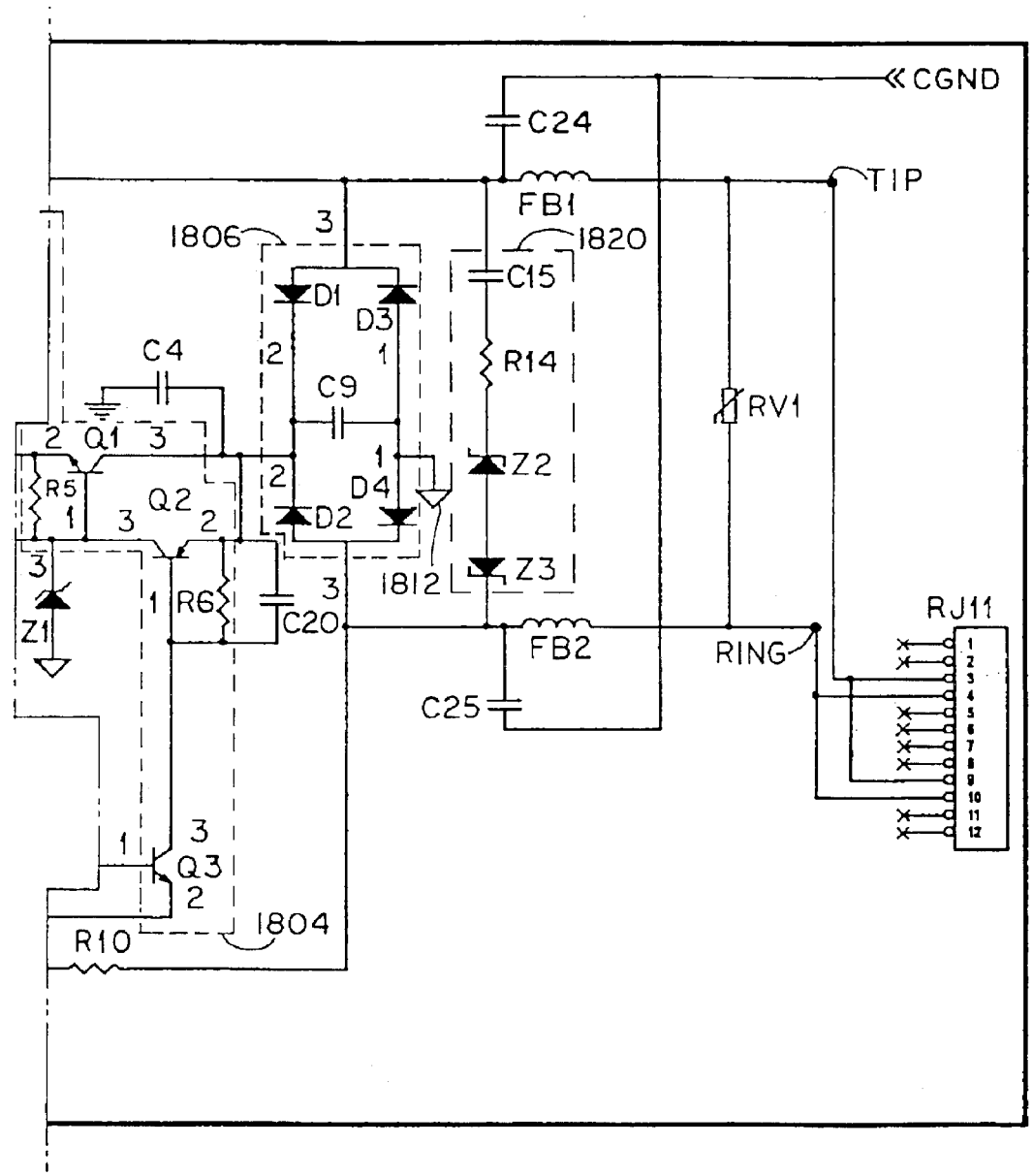

The hybrid and DC termination circuitry 1617 may have a number of external pins that also connect to external telephone interface circuitry such as hook-switch circuitry and a diode bridge as shown in FIGS. 2 and 4. For example, the hybrid and DC termination circuitry 1617 may have a DC termination pin (DCT), a voltage regulator pin (VREG), two external resistor pins (REXT and REXT2), two filter pins (FILT and FILT2) and an isolated ground pin (IGND). The DC termination circuitry terminates the DC voltage on the phone line and provides an internal power supply for the phone line side circuitry 118. The DC termination pin (DCT) receives a portion of the phone line DC current with the remainder flowing through pins QE2 and QB2, depending upon the termination mode and DC current level. The voltage regulator pin (VREG) allows external regulator circuitry, such as a capacitor, to be connected to the DC termination circuitry 1617. External resistors and a capacitor may be connected to the two external resistor pins (REXT and REXT2) to set the real and complex AC termination impedance respectively. The filter pin FILT (along with the capacitor C5) sets the time constant for the DC termination circuit. The filter pin FILT2 sets the off hook/on hook transient responses for pulse dialing. The isolated ground pin (IGND) may be connected to the system ground for the powered side circuitry 116 through a capacitor within the isolation barrier 120 and may also be connected to the phone line through a ground connection within external diode bridge circuitry.

The off-hook/ring-detect block 1620 may halve external input pins allowing status information to be provided concerning phone line status information (RNG1, RNG2), such as ring and caller identification signals. For example, the first ring detect pin (RNG1) may connect to the tip (T) lead of the phone line through a capacitor and resistor, and the second ring detect pin (RNG2) may connect to the ring (R) lead of the phone line through a capacitor and resistor. In addition, off-hook/ring-detect block 1620 may have external output pins (QB, QE) that control external off-hook circuitry to enter, for example, an off-hook state or a limited power mode to get caller identification information. More particularly, the output pins (QB, QE) may be connected to the base and emitter, respectively, of a bipolar transistor within external hook-switch circuitry.

Figure 3:
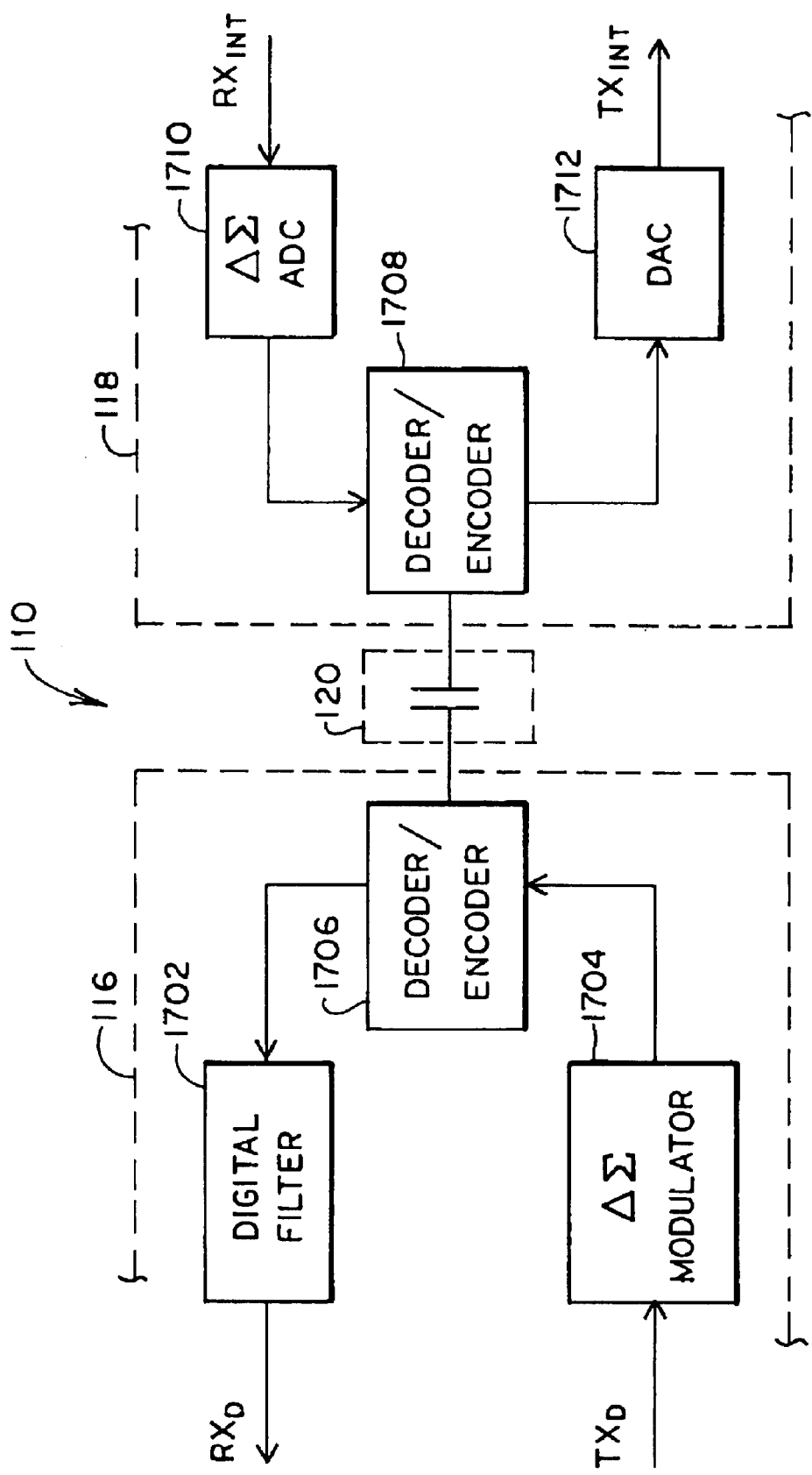
FIG. 3 is a general block diagram of transmit and receive signal paths within digital DAA circuitry according to the present invention.

Also FIG. 3 is a general block diagram of internal transmit (TX) and receive (RX) signal paths within digital DAA circuitry 110 according to the present invention. In the embodiment depicted, information may be communicated in either direction across the isolation barrier 120. It is noted that FIG. 3 does not depict all of the functional blocks within powered side circuitry 116 and phone line side circuitry 118. It is also noted that the blocks depicted may be implemented as numerous additional blocks carrying out similar functions.

In the embodiment of FIG. 3, communications from the phone line side circuitry 118 to the powered circuitry 116 are considered receive signals. Within phone line side circuitry 118, a delta-sigma analog-to-digital converter (ADC) 1710 receives an internal analog receive signal ($RX_{INT}$), which may be provided for example by hybrid circuitry 1617. The output of delta-sigma ADC 1710 is oversampled digital data stream in a pulse density modulation format. The decoder/encoder circuitry 1708 processes and formats this digital information as desired before sending it across the isolation barrier 120 as encoded digital information. For example, decoder/encoder 1708 may multiplex control data with the digital stream before it is sent across the isolation barrier 120. This control data may be any desired information, such as ring detect signals, off-hook detect signals, other phone line status information or data indicative of the country in which the DAA will be utilized (so that the appropriate phone line interface standards will be satisfied). Within powered side circuitry 116, the decoder/encoder 1706 decodes this encoded digital information received across the isolation barrier 120. The digital filter 1702 processes this decoded digital stream and converts it into internal digital receive data ($RX_D$) that may be provided through the digital interface 1606 to an external controller.

Communications from the powered side circuitry 116 to the phone line side circuitry 118 are considered transmit signals. Within powered side circuitry 116, a delta-sigma modulator 1704 receives an internal digital transmit signal ($TX_D$), which may be provided for example from an external controller through digital interface 1606. The output of delta-sigma modulator 1704 is an oversampled digital data stream in a pulse density modulation format. The decoder/encoder circuitry 1706 processes and formats this digital information as desired before sending it across the isolation barrier 120 as encoded digital information. For example, decoder/encoder 1706 may multiplex control data with the digital stream. This control data may be any desired information, such as ring detect signals, off-hook detect signals, or other phone line status information. In addition, decoder/encoder 1706 may add framing information for synchronization purposes to the digital stream before it is sent across the isolation barrier 120. Still further, decoder/encoder 1706 may format the digital data stream so that a clock signal may be recovered within the phone line side circuitry 118, for example. Within phone line side circuitry 118, the decoder/encoder 1708 may recover a clock signal and may decode the encoded digital information received across the isolation barrier 120 to obtain framing, control or status information. The digital-to-analog converter (DAC) 1712 converts the decoded digital stream and converts it into internal analog transmit data ($TX_{INT}$) that may be provided as an analog signal through the hybrid circuitry 1617 and ultimately to the phone lines.

FIG. 4 is a general circuit diagram of digital DAA circuitry 110 implemented with two integrated circuits (ICs) and a capacitive isolation barrier 120 according to the present invention. The DAA circuitry 110 may be coupled to phone line TIP and RING lines as shown. In particular, powered side circuitry 116 may include a powered side integrated circuit (IC) 1802 A, and phone line side circuitry 118 may include a phone line side IC 1802B. External discrete devices may be coupled to the TIP line, RING line, phone line side IC 1802B and powered side IC 1802A. The external circuitry may include circuitry, such as hookswitch circuitry 1804, diode bridge circuitry 1806, and impedance circuitry 1820. During an on-hook condition, typical prior art hookswitches may typically be turned off thus not allowing loop current to be drawn from the phone line. Prior art hookswitches may include bipolar and/or relay switches. During an off-hook condition, the switches may be placed in saturation and act as a switch that "seizes" or "collapses" the phone line, i.e. draws all the available phone line current. The communication system disclosed herein allows for the hookswitch devices to draw loop current from the phone line in both on-hook and off-hook conditions. Thus, event an on-hook condition occurs, current may be obtained through the hookswitch devices. This feature allows circuitry which operates during on-hook conditions to still receive power from the phone line. Moreover because the hookswitch devices are utilized for drawing powder in both on-hook and off-hook conditions, the use of additional switches dedicated to drawing the power during on-hook conditions is not required.

In the embodiment depicted in FIG. 4, external pins 1809 of the powered side IC 1802A are connected to an external digital signal processor (DSP) and to a external application specific IC (ASIC) or controller. The isolation barrier 120 may include a first capacitor (C1) connecting an external signal (C1A) pin on the powered side IC 1802A to an external signal (C1B) pin on the phone line side IC 1802B. In addition, the isolation barrier 120 may have a second capacitor (C2) connecting the isolated ground (IGND) pin on the phone line side IC 1802B to the system ground (GND) pin on the powered side IC 1802A. In addition, the isolated ground (IGND) pin may be connected to node 1812 within diode circuitry 1806 (and thereby be connected to the phone line) and the remaining ground connections of the external circuitry of the phone line side circuitry 118.

Typical component values for the various external capacitors, resistors, transistors, and diodes for the circuit of FIG. 4 are shown in Table 1 and Table 2. As used in the Tables, when a device is listed as "Not Installed" the device may be considered to be an open circuit. Table 1 illustrates external components that may be used for a global DAA (i.e. for use in multiple countries, including the U.S.) while Table 2 illustrates simplified circuitry for meeting U.S. FCC and CTR21 requirements only. As discussed below in more detail, the components C15, R14, Z2, and Z3 of Table 1 may be not installed for all countries except the Czech Republic.

TABLE 1

Global External Component Values

| Symbol | Value |
| --- | --- |
| C1, C2 | 150 pF, 2 kV, ±20% |
| C3, C6, C10, C16 | 0.1 μF, 16 V, ±20% |
| C4, C11, C23, C28, C29 | NOT INSTALLED |
| C5 | 0.1 μF, 50 V, ±20% |
| C7, C8 | 1800 pF, 300 V, ±5% |
| C9 | 22 nF, 300 V, ±20% |
| C12 | 0.22 μF, 16 V, ±20% |
| C13 | 0.47 μF, 16 V, ±10% |
| C14 | 0.68 uF, 16 V, ±10% |
| C15 | 1.0 μF, 250 V, ±20% |
| C18, C19 | 12 nF, 16 V, ±10% |
| C20 | 0.01 μF, 16 V, ±10% |
| C21 | NOT INSTALLED |
| C22 | 1800 pF, 50 V, ±10% |
| C24, C25 | 1000 pF, 2000 V, ±10% |
| R1, R4, R21, R22, R23 | NOT INSTALLED |
| R2 | 402 Ω, 1/16 W ±1% |
| R3 | NOT INSTALLED |
| R5 | 36 kΩ, 1/16 W, ±5% |
| R6 | 120 kΩ, 1/16 W ±5% |
| R7, R8, R15, R16, R17, R19 | 4.87 KΩ, 1/4 W ±1% |
| R9, R10 | 15 kΩ, 1/10 W ±5% |
| R11 | 10 kΩ, 1/16 W ±1% |
| R12 | 78.7 Ω, 1/16 W ±1% |
| R13 | 215 Ω, 1/16 W ±1% |
| R14 | 7.5 kΩ, 1/4 W ±5% |
| R18 | 22 kΩ, 1/10 W ±5% |
| R24 | 150 Ω, 1/16 W ±5% |
| Q1, Q3 | A42, NPN 300 V |
| Q2 | A92, PNP 300 V |
| Q4 | 2N2222 NPN 40 V 1/2 W |
| FB1, FB2 | Ferrite Bead |
| RV1 | Sidactor 275 V, 100 A |
| D1–D4 | 1N4004 |
| Z1 | Zener Diode 43 V |
| Z2, Z3 | Zener Diode 5.6 V |

TABLE 2

FCC/CTR21 Only External Component Values

| Symbol | Value |
| --- | --- |
| C1, C2 | 150 pF, 2 kV, ±20% |
| C3, C6, C10, C16 | 0.1 uF, 16 V, ±10% |
| C5 | 0.10 μF, 50 V ±20% |
| C7, C8 | 1800 pF, 250 V, ±10% |
| C9 | 22 nF, 250 V, ±20% |
| C12 | 0.22 uF, 16 V, Tant, ±10% |
| C13 | 0.47 uF, 16 V, ±10% |
| C18, C19 | 12 nF, 16 V, ±10% |
| C20 | 0.01 uF, 16 V, ±10% |
| C22 | 1800 pF, 50 V ±10% |
| C24, C25 | 1000 pF, 2 kV ±10% |
| C4, C11, C14, C15, C17, C21, C23, C28, C29 | NOT INSTALLED |
| R2 | 402 Ω, 1/16 W ±1% |
| R5 | 36 kΩ, 1/16 W ±5% |
| R6 | 120 kΩ, 1/16 W ±5% |
| R1, R3, R4, R14, R12, R13, R21, R22, R23 | NOT INSTALLED |
| R9, R10 | 15 kΩ, 1/10 W ±5% |
| R7, R8, R15, R16, R17, R19 | 4.87 kΩ, 1/4 W ±1% |
| R11 | 10 kΩ, 1/16 W ±1% |
| R18 | 2.2 kΩ, 1/10 W ±5% |
| R24 | 150 Ω, 1/16 W ±5% |
| Q1, Q3 | A42, NPN 300 V |
| Q2 | A92, PNP 300 V |
| Q4 | 2N2222, NPN, 40 V 1/2 W |
| FB1, FB2 | Ferrite Bead |
| RV1 | Sidactor 275 V, 100 A |
| D1–D4 | 1N4004 |
| Z1 | Zener Diode 43 V |
| Z2, Z3 | NOT INSTALLED |

An exemplary embodiment of the present invention will be discussed below with reference to a configuration according to FIG. 4 as configured as shown in Table 1. It will be recognized, however, that the concepts of the present invention may be implemented in other configurations. According to the present invention, DAA circuitry may be utilized which satisfies many or all hookswitch transition standards. The hookswitch transition standards may be satisfied by ramping down the current flowing through the hookswitch prior to transitioning the hookswitch state. In this manner the hookswitch current change as a function of time (di/dt) may be decreased. Thus, the current through the hookswitch may be actively controlled prior to switching the hookswitch from an off-hook condition to an on-hook condition. By controlling the current drawn from the phone lines through the hookswitch, the maximum voltage seen at the TIP and RING lines may be decreased and pulse dialing specifications which require the transition to an on-hook condition to occur slowly may be satisfied.

Figure 5:
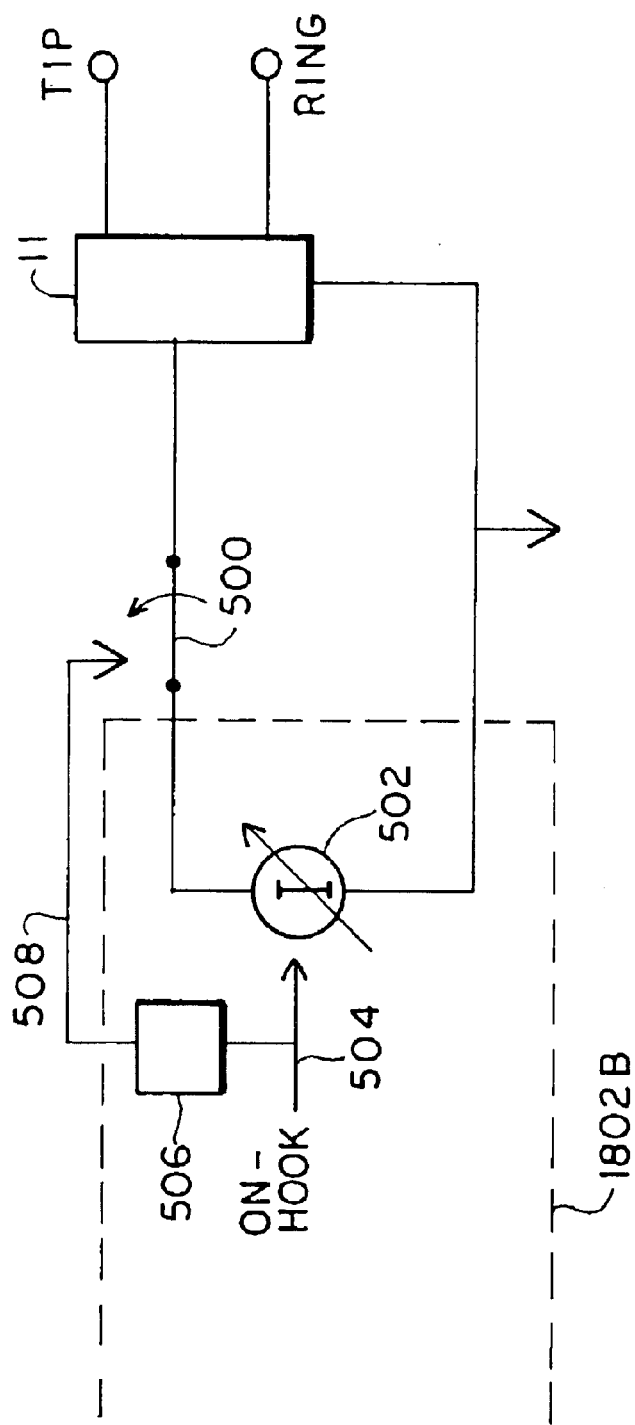
FIG. 5 is a conceptual diagram of a circuit according to the present invention.

The technique for transitioning the state of a hookswitch as disclosed herein may be conceptually seen with respect to FIG. 5. As shown in FIG. 5, the TIP and RING lines are coupled to a hookswitch 500 through a diode bridge 11. The hookswitch may then be coupled to a phone line side DAA integrated circuit 1802B which may include a variable current source 502. The variable current source 502 may be affected by an on-hook control signal 504. The on-hook control signal 504 may also be provided to a delay element 506 to provide a delayed on-hook control signal 508. In operation, the circuit may initially be in an off-hook condition (hookswitch 500 is closed) and the current drawn through the hookswitch may be at a steady state (i.e. the current through the current source 502 is at a relatively high off-hook steady state). Then an on-hook state is desired, the on-hook control signal 504 will change to an on-hook state. Thus, the control signal 504 operates as a signal indicative of a hookswitch transition. In response to an on-hook state at the on-hook control 504, the current through current source 502 is ramped down. However, the delay element 506 causes results in the delayed on-hook control signal 508 to indicate an on-hook state to the hookswitch 500 at some time after the current ramp down has begun. In this manner, the ramp down of the current may occur in a more controlled slow manner and commenced prior to the hookswitch 500 opening.

The current through current source 502 does not have to be completely ramped down prior to the opening of the hookswitch 500. Rather, the current need only be dropped to a level sufficiently low so that the current change (di/dt) when the hookswitch 500 open does not exceed a level that results in the failure to meet pulse dialing and spark quenching specifications.

Moreover, though described conceptually in FIG. 5 with respect to a hookswitch which opens instantaneously in response to a control signal, the hookswitch may be constructed in a manner such that the switch transitions from a fully closed state to a fully opened state over some time period. Thus, the on-hook control signal 504 may be applied to both the hookswitch 500 and the current source 502 at the same time. In this example, the current ramp down by current source 502 may commence simultaneously with the beginning of the change of state of the hookswitch 500. The benefits of the techniques disclosed herein will still be achieved since the current level is still ramped down to some extent prior to the hookswitch reaching it open circuit condition.

Figure 6:
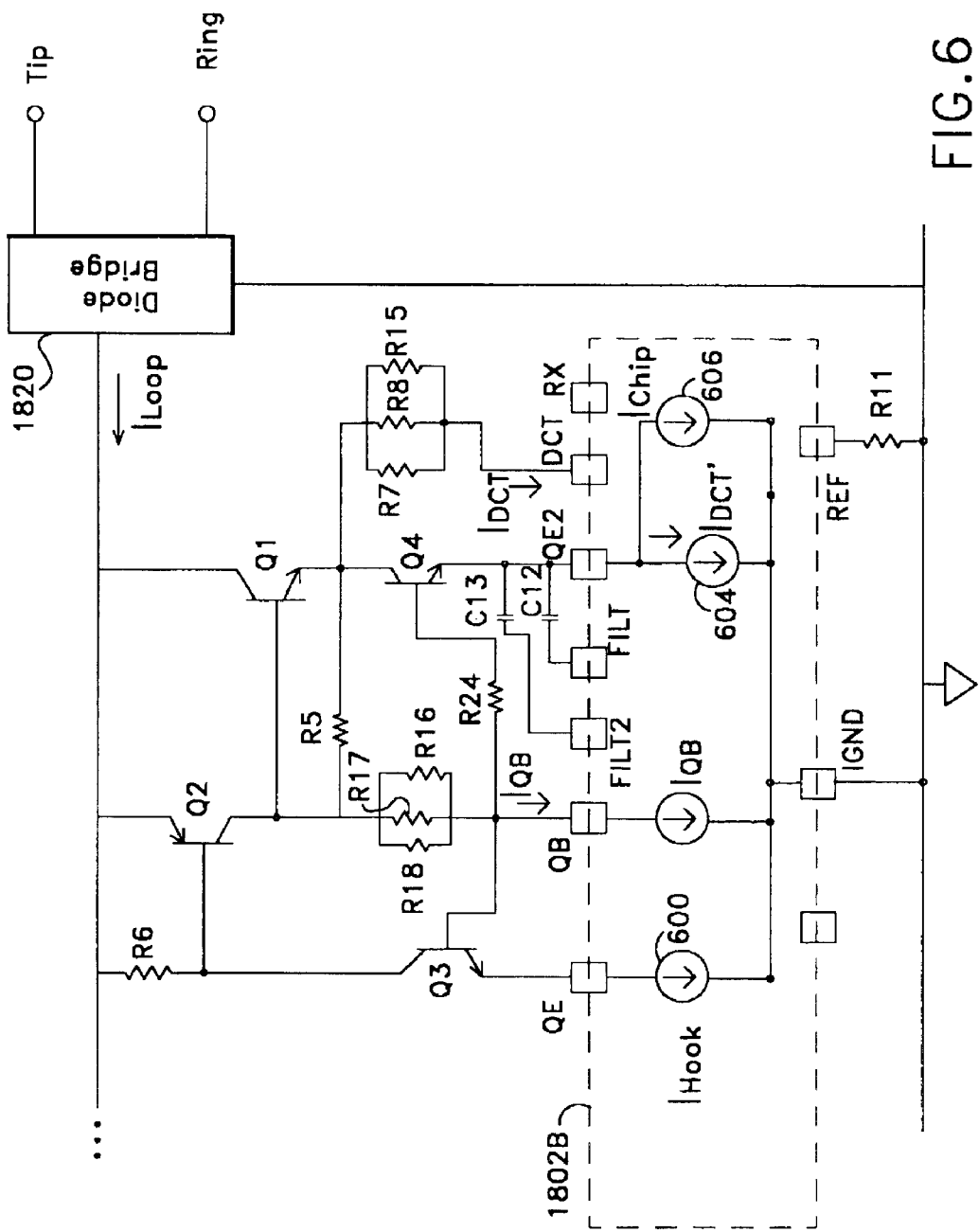
FIG. 6 illustrates a hookswitch circuit and DAA which may be controlled according to the present invention.

Example circuitry for achieving a current ramp when transition from off-hook to on-hook conditions in shown in FIG. 6. FIG. 6 illustrates the phone line side DAA integrated circuit 1802B and the surrounding external hookswitch circuitry using the same nomenclature and circuit connections as shown in FIG. 4. As seen in FIG. 6, the TIP and RING lines are provided to the diode bridge 1820. The diode bridge is coupled to the phone line side DAA integrated circuit 1802B through the hookswitch circuitry which includes transistors Q1, Q2, Q3 and Q4 and associated resistors. The hookswitch circuitry shown herein is merely exemplary, and many other hookswitch circuits may utilize the techniques of the present invention. The phone line side DAA integrated circuit 1802B is indicated by the dashed line and includes input/output pins QE, QB, QE2, IGND, FILT, FILT2 and REF. The DAA integrated circuit 1802B includes an $I_{HOOK}$ current source 600, an $I_{DCT}'$ current source 604, an $I_{CHIP}$ source 606 and an $I_{QB}$ current source. The current $I_{HOOK}$ operates to control the activation of transistor Q2. When the current $I_{HOOK}$ is zero the hookswitch is in an on-hook state and transistor Q2 is off. When the current $I_{HOOK}$ is on, transistor Q2 is activated and current flows through Q2. When the current $I_{HOOK}$ is large enough (for example approximately 4 mA), transistor Q2 is in saturation and the hookswitch is in the off-hook mode. During off-hook conditions, the loop current is the sum of the currents $I_{HOOK}$, $I_{DCT}$, $I_{DCT}'$, $I_{QB}$, and $I_{CHIP}$. As will be described below, the current $I_{DCT}'$ is created by current mirroring (32X) the current $I_{DCT}$. In off-hook conditions, $I_{QB}$ is similar in magnitude to the current $I_{DCT}$. The current $I_{CHIP}$ represents all other currents drawn on chip. The $I_{HOOK}$ current is related to the currents $I_{DCT}$, $I_{DCT}'$, and $I_{QB}$ as described below in more detail.

The current change over time change (di/dt) which occurs when the hookswitch transitions from an off-hook state to an on-hook state may be minimized by ramping down the currents $I_{DCT}'$, $I_{HOOK}$, and $I_{CHIP}$ prior to the hookswitch going completely on-hook (i.e. the hookswitch is opened and Q2 is off). Ramping down the currents lowers the loop current flowing through the hookswitch prior to opening the hookswitch. Thus, by the time $I_{HOOK}$ reaches a level sufficiently low to turn off Q2, and thus open the hookswitch, the total loop current will have already significantly dropped in a relatively slow and controlled manner. For example, a typical loop current may be approximately 100 mA in the off-hook mode and after approximately 1.5 to 2 msec may have dropped to 2 mA prior to the hookswitch completely opening. Thus, the loop current may decrease by 50% or more prior to the hookswitch opening, and more preferably by more than 75%.

Figure 7:
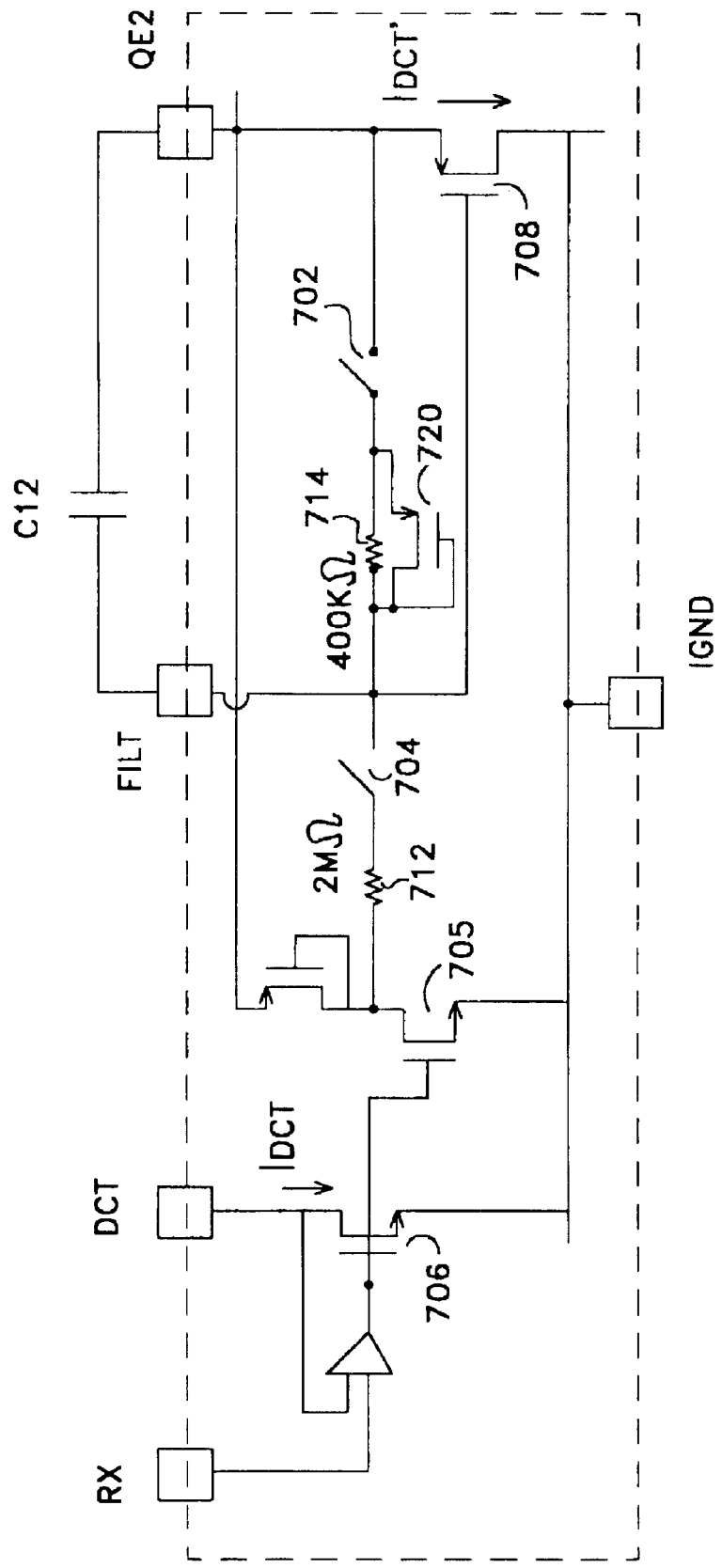
FIG. 7 illustrates a circuit for ramping a component of the loop current prior to transitioning the hookswitch.
Figure 8:
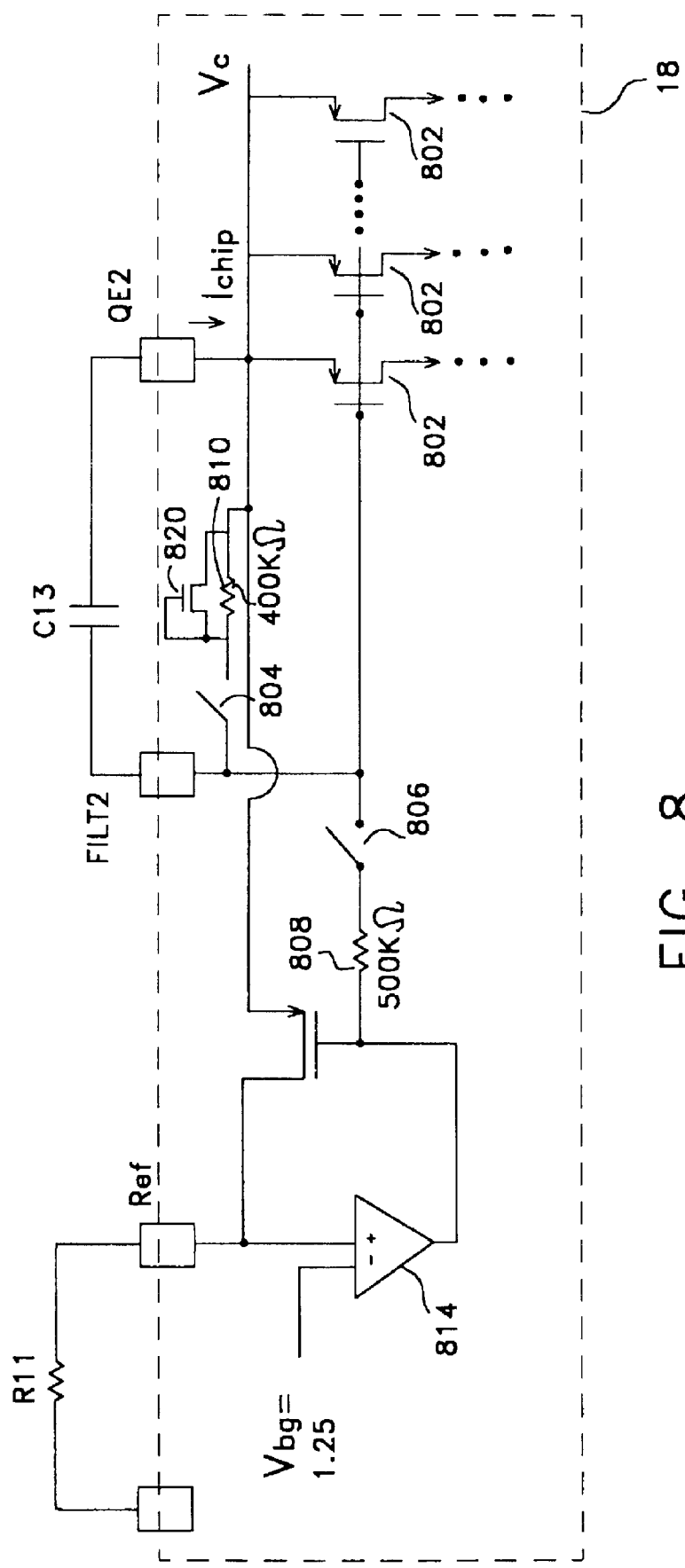
FIG. 8 illustrates a circuit for ramping a component of the loop current prior to transitioning the hookswitch.
Figure 9:
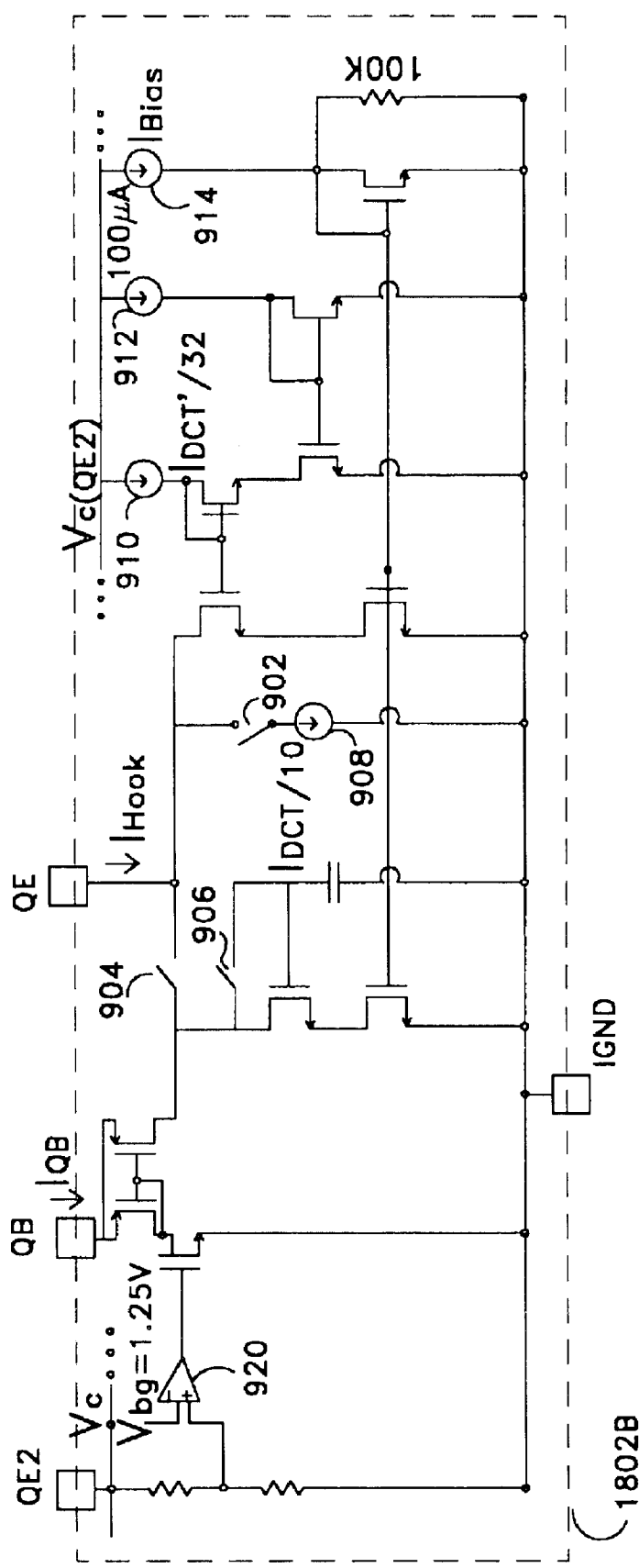
FIG. 9 illustrates a circuit for ramping a component of the loop current prior to transitioning the hookswitch.

Circuitry for ramping down the currents $I_{DCT}'$, $I_{CHIP}$, and $I_{HOOK}$ may be seen with respect to FIGS. 7, 8, and 9 respectively. As shown in FIG. 7, the current $I_{DCT}'$ may be generated by use of current mirror transistors 706, 705, and 708 which are sized to provide a current $I_{DCT}'$ that is 32 times the current $I_{DCT}$. During off-hook operation the switch 704 is closed and the switch 702 is opened. Connected to switch 704 is a large resistance resistor 712 (2 MΩ) and connected to switch 702 is a smaller resistance resistor 714 (400 KΩ). Switch 704 is connected to the FILT pin of the phone line side DAA integrated circuit 1802B and switch 702 is coupled between the FILT pin and the QE2 pin as shown. A diode connected transistor 720 may be connected to the resistor 714 as shown. Coupled between the FILT pin and the QE2 pin is an external capacitor C12. As shown in Table 1, C12 may have a capacitance of 0.22 uF. As mentioned above, in the steady-state off-hook operation switch 702 is open and 704 is closed. This provides a path to the gate of transistor 708 to generate the 32X mirror current through transistor 708. When a transition to an on-hook state is signaled to switches 704 and 702 (such as for example by an on-hook control signal 504 as shown in FIG. 5), switch 704 is opened and switch 702 is closed. This will result in a change in the gate voltage of transistor 708 (and thus correspondingly the current $I_{DCT}'$) that is dependent upon the time constant of the internal resistor 714 and the external capacitor C12. The di/dt of the current $I_{DCT}'$ is therefore affected by the values chosen for the resistor 714, transistor 720 and the capacitor C12.

Similarly, the $I_{CHIP}$ may be ramped down as shown in FIG. 8. As shown in FIG. 8, a Vc supply voltage level is provided to the phone line side DAA integrated circuit 1802B at the QE2 pin. Coupled between the FILT2 pin and tie QE2 pin is an external capacitor C13 (for example 0.47 uf as shown in Table 1). Coupled to Vc is a plurality of p-channel chip bias transistors 802 which provide bias currents to the various circuits of the phone line side DAA integrated circuit 1802B. These bias currents together result in the current $I_{CHIP}$. During off-hook operation, the switch 806 is closed and the switch 804 is opened. Coupled to switch 806 is an internal resistor 808 (for example 500 KΩ) and coupled to switch 804 is an internal resistor 810 (for example 400 KΩ). A diode connected transistor is connected to resistor 810 as shown. The voltage applied through switch 806 to the gates of transistors 802 when the circuitrylis in an off-hook mode is generated with a differential amplifier 814 having a bandgap voltage of 1.2 V and the REF pin voltage as its two inputs as shown. In off-hook operation, the switch 806 is closed and the switch 804 is opened. When a transition to on-hook operation is desired (for example as signaled by the on-hook control signal 504 ), the switch 806 opens and the switch 804 closes. This will result in transistors 802 to begin to turn off and the current $I_{CHIP}$ will begin to ramp down. The speed at which the transistors will turn off and the current ramps down will be dependent upon the time constant of external capacitor C13, transistor 820, and the internal resistor 810. The di/dt of the current $I_{CHIP}$ is therefore affected by the values chosen for the resistor 714 and the capacitor C12.

A circuit for controlling the current $I_{HOOK}$ is shown in FIG. 9. As with the $I_{DCT}'$ and the $I_{CHIP}$ currents, the current $I_{HOOK}$ may be ramped down in response to the on-hook control signal 504. As shown in FIG. 8, a Vc supply voltage level is provided to the phone line side DAA integrated circuit 1802B at the QE2 pin. The op amp 920 and associated circuitry coupled to the QE2 and QB pins (internally and externally) generate a feedback loop which maintains QE2 at approximately 2.6 V during off-hook conditions. Also shown in FIG. 9 are current sources 908, 910, 912 and 914. Current sources 908 and 910 are proportional to the currents $I_{DCT}$ and $I_{DCT}'$ respectively as shown. Thus as current source $I_{DCT}'$ is ramped downward as described above, current source 910 will be ramped downward. The current source 914 is a bias current $I_{BIAS}$ that is generated from a bias device that is controlled such as transistor 802 of FIG. 8 is controlled, and therefore bias current $I_{BIAS}$ will ramp downward similar to the manner that current source $I_{CHIP}$ ramps downward as described with reference to FIG. 8. Switches 902, 904, and 906 are responsive to a hookswitch transition signal such as the on-hook control signal 504. More particularly, during on-hook states switches 902 and 906 are opened and switch 904 is closed. During off-hook states, switches 902 and 906 are closed and switch 904 is opened.

In operation, the circuit of FIG. 9 operates such that in response to on-hook control signal 504 the switches 902, 904, and 906 will switch states. Further, the current sources 910 and 914 will begin to ramp downward. This circuit changes will cause $I_{HOOK}$ to begin to drop. For example with an off-hook loop current of 100 mA, $I_{HOOK}$ may be 4 mA and Q2 (see FIG. 6) may be saturated. As $I_{HOOK}$ drops toward zero, Q2 will first enter an active region and then reach an off state. At this point the bookswitch will be open.

Figure 10:
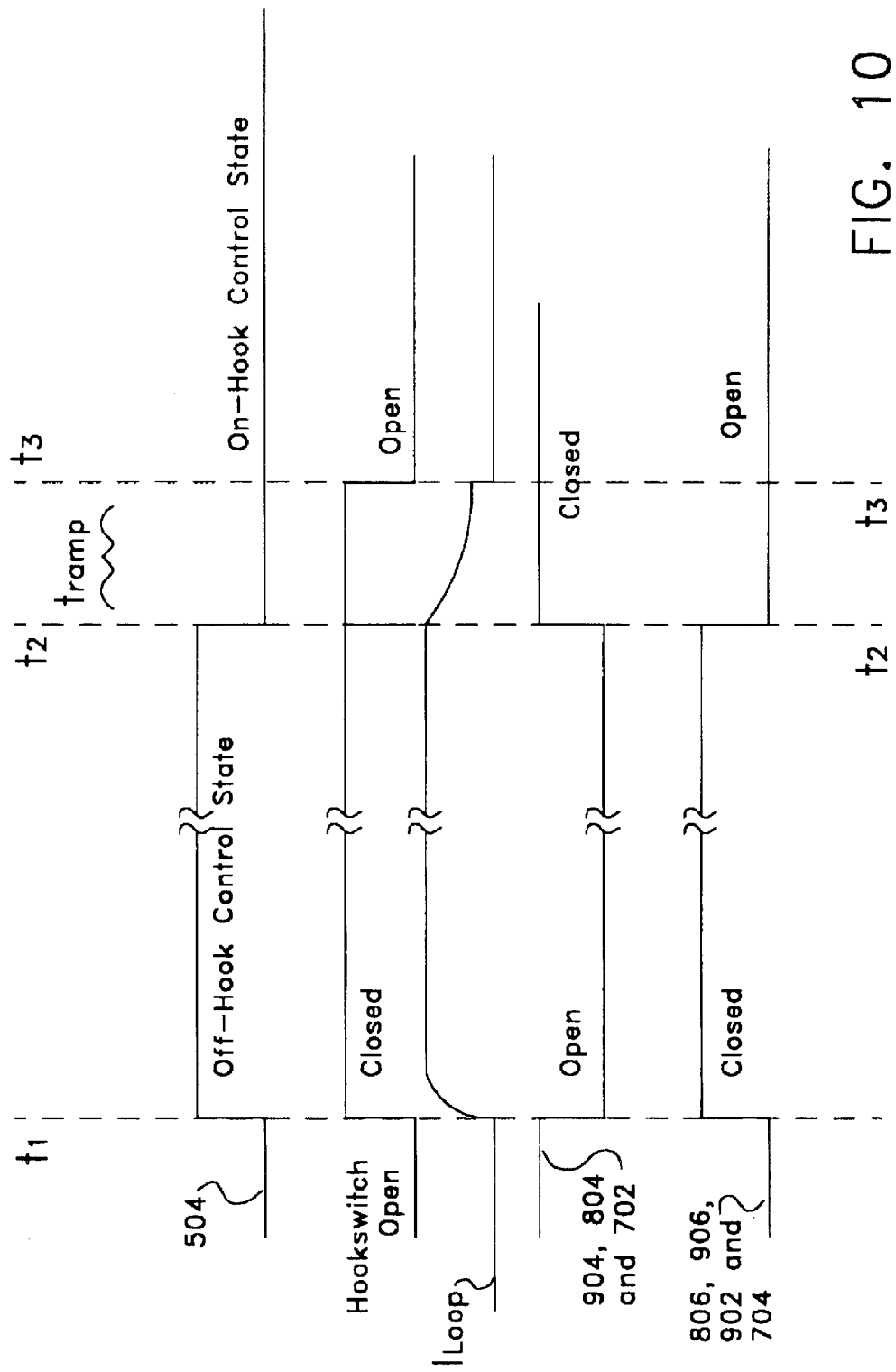
FIGS. 10 and 10A are timing diagrams of the circuits of FIGS. 7, 8 and 9.
Figure 10A:
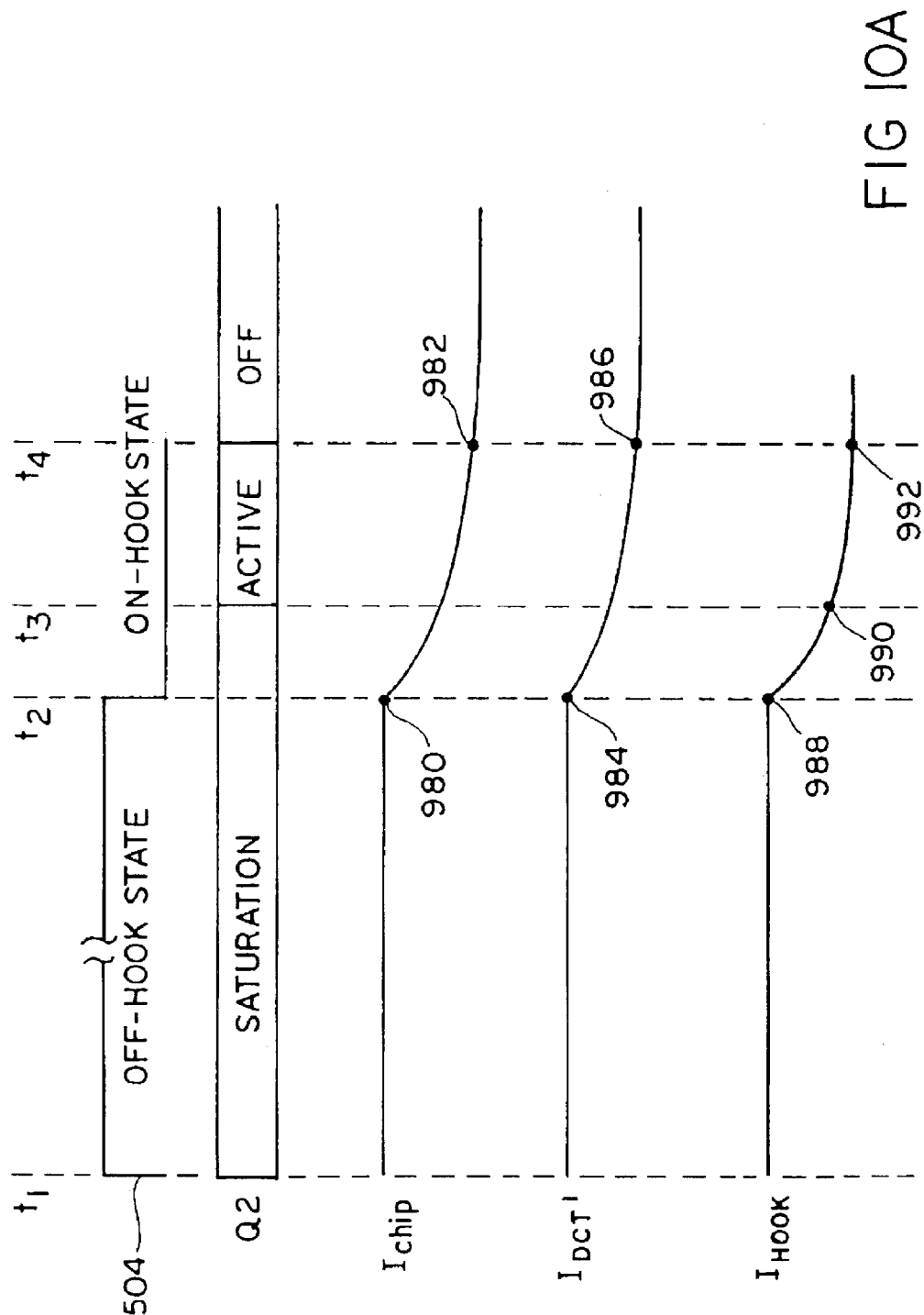

The operation of the switches 702, 704, 804, 806, 902, 904, and 906 in relation to the off-hook or on-hook state may be seen with respect to FIG. 10. In FIG. 10, the hookswitch is idealized to being either on or off. FIG. 10A illustrates the embodiment discussed herein in which the hookswitch may include a transistor Q2 which transitions from a saturation region (off-hook), to an active region to an off state (on-hook). As shown in FIG. 10, a on-hook control signal 504 changes from a state indicating on-hook conditions are desired to a state indicating off-hook conditions are desired at time $t_1$. At that time switches 702, 804, and 904 change from closed to opened states and switches 704, 806, 902 and 906 change from open to closed states. The hookswitch also changes from being opened to being closed and the loop current $I_{LOOP}$ rises as shown in FIG. 10. At time $t_2$ the on-hook control signal 504 changes to the on-hook control state. At that time switches 702, 804, and 904 change from opened to closed states and switches 704, 806, 902 and 906 change from closed to open states. At time $t_2$ the loop current $I_{LOOP}$ begins to ramp down over the period $t_{RAMP}$ as sh own in FIG. 10. At time $t_3$ the hookswitch is completely opened and the loop current $I_{LOOP}$ drops to zero.

As mentioned above, FIG. 10 conceptualizing the hookswitch as being instantaneously on or off. As shown in FIG. 10A, a timing diagram is shown in which a hookswitch includes a transistor such as transistor Q2 which transitions from saturation to active to off states. FIG. 10A illustrates the on-hook control signal 504 switching to the off-hook state at time $t_1$ and then switching to the on-hook state at time t2. The transistor Q2 is in saturation between times t1 and t3. The transistor Q2 enters an active state between times t3 and t4 and finally enters an off state at time t4. An exemplary time ranges for the time t3-t2 may be 0–100 usec. An exemplary time range for the time t4-t3 (i.e. the time in the active state) may be 1–5 msec. With a 100 mA off-hook loop current, exemplary values for $I_{HOOK}$ may be 4 mA at point 988, 8 uA at point 990 and 7 uA at point 992. At point 992 the value of $I_{HOOK}$ will have dropped sufficiently low that the supply voltage will collapse and the current through the hookswitch will then drop to close to zero. Exemplary values for $I_{CHIP}$ may be 5 mA at point 980 and dropping close to zero at point 982 according to a time constant affected by the value of capacitor C13. Exemplary values for $I_{DCT}'$ may be 85 mA at point 984 and dropping close to zero at point 986 according to a time constant affected by the value of capacitor C12. Thus, it may be seen that the substantial components of the loop current may be substantially decreased (individually and collectively) between the time t2 at which the on-hook control signal 504 changes and time t4 when the hookswitch is completely open.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, equivalent elements may be substituted for those illustrated and described herein, and certain features of the invention may be utilized independently of the use of other features, all as would be apparent to one skilled in the art after having the benefit of this description of the invention. Moreover, the various aspects of the inventions disclosed herein may be used in combination or separately as will also be apparent to those skilled in the art.

We claim:

1. A communication system, comprising:
   phone line side circuitry that is capable of being coupled to phone lines;
   powered side circuitry that is capable of being coupled to the phone line side circuitry through an isolation barrier;
   a hookswitch transition node carrying a hookswitch transition signal indicative of a desire to change a hookswitch within the phone line side circuitry from an off-hook state to an on-hook state; and
   current control circuitry coupled to the hookswitch transition node within the phone line side circuitry, the current control circuitry operating prior to the completion of a hoolswitch transition to enable a decrease in a current level drawn from the phone line in response to the hookswitch transistion signal.

2. The communication system of claim 1, further comprising at least one switch within a phone line side DAA integrated circuit, the switch being responsive to the hookswitch transition signal to implement at least a portion of the ramping of the current drawn from the phone line.

3. The communication system of claim 2, wherein the phone line side circuitry and the powered side circuitry are configured to communicate across the isolation barrier through digital signals, wherein the digital signals include a digital phone line data stream multiplexed with control data before the digital signals are sent across the isolation barrier.

4. The communication system of claim 3, further comprising the isolation barrier coupled between the phone line side circuitry and the powered side circuitry, the isolation barrier comprising one or more capacitors.

5. The communication system of claim 1, the hookswitch comprising at least one bipolar transistor.

6. The communication system of claim 1, further comprising the isolation barrier coupled between the phone line side circuitry and the powered side circuitry, the isolation barrier being a capacitive barrier.

7. The communication system of claim 1, wherein the phone line side circuitry and the powered side circuitry are configured to communicate across the isolation barrier through digital signals, wherein the digital signals include a digital phone line data stream multiplexed with control data before the digital signals are sent across the isolation barrier.

8. The communication system of claim 7, further comprising the isolation barrier coupled between the phone line side circuitry and the powered side circuitry, the isolation barrier being a capacitive barrier.

9. The communication system of claim 8, the current being ramped downward to a value of less than or equal to 50% of the currents drawn from the phone line prior to a transition in the hookswitch transition signal.

10. A method of operating a communication system that is capable of being coupled to a phone line, comprising:
   coupling an isolation barrier between powered circuitry and phone line side circuitry;
   drawing current at a first current level from the phone line through the hookswitch circuitry;
   providing hookswitch circuitry within the phone line side circuitry, the hookswitch circuitry setting the communication system in a phone line off-hook state or a phone line on-hook state; and
   adjusting downward the current drawn through the hookswitch to a second level in response to a signal indicative of a desired state of the hookswitch circuitry prior to changing the hookswitch from an off-hook state to an on-hook state, the second current level being less than the first current level.

11. The method of claim 10, further comprising utilizing a capacitive barrier to isolate the powered circuitry and the phone line circuitry.

12. The method of claim 11, further comprising passing digital signals across the isolation barrier.

13. The method of claim 12 wherein the digital signals include a digital phone line data stream multiplexed with control data before the digital signals are sent across the isolation barrier.

14. The method of claim 12, further comprising utilizing a capacitive barrier to isolate the powered circuitry and the phone line circuitry.

15. The method of claim 14, the current being adjusted downward while the hookswitch begins to change states.

16. The method of claim 15, the second current level being less than or equal to 50% of the first current level when the hookswitch has completely changed states.

17. The method of claim 15, wherein the current drawn through the hookswitch exceeds 1 mA.

18. A hookswitch transition circuit within a communication system that is capable of being connected to phone lines, the hookswitch transition circuit comprising:
   a hookswitch control node carrying a hookswitch control signal to control a hookswitch;
   at least one variable current circuit coupled to the hookswitch control node, the at least one variable current circuit responsive to the hookswitch control signal to decrease a current drawn from the phone lines prior to changing the state of the hookswitch; and
   at least one switch coupled to the hookswitch control node within a phone line side DAA integrated circuit.

19. The hookswitch transition circuit of claim 18, the at least one variable current circuit comprises at least two variable current circuits, each coupled to the hookswitch control node.

20. The hookswitch transition circuit of claim 18, the hookswitch control signal also initiating a change of state of the hookswitch.

21. The hookswitch transition circuit of claim 18, the at least one variable current circuit being responsive to the hookswitch control signal when the hookswitch control signal indicates a transition from an off-hook state to an on-hook state.

22. The hookswitch transition circuit of claim 18, a current level within the at least one variable current circuit having a first current level when the hookswitch control signal is in an off-hook state and a current level within the at least one variable current circuit having a second level when the hookswitch control signal is in an on-hook state, the second current level being less than the first current level.

23. The hookswitch transition circuit of claim 18, the current drawn from the phone lines being decreased to a second current level that is 50% or less than a first current level, the first current level being an off-hook current level and the second level being attained prior to the hookswitch completing a transition to an on-hook state.

24. A method of controlling current in a phone line, comprising:
   actively controlling at least one current circuit of a DAA integrated circuit in response to a hookswitch transition signal; and
   substantially decreasing the current in the phone fine as a result of the active control prior to achieving an on-hook state.

25. The method of claim 24, wherein the hookswitch transition signal is indicative of a transition from an off-hook state to an on-hook state.

26. The method of claim 25, wherein the current is decreased by at least 50%.

27. The method of claim 24, wherein the actively controlling further comprises controlling a plurality of current circuits.

28. The method of claim 24, wherein the active control includes changing the state of at least one switch within the DAA integrated circuit.

29. The method of claim 28, wherein the at least one circuit is coupled to the hookswitch.

* * * * *

UNITED STATES PATENT AND TRADEMARK OFFICE
CERTIFICATE OF CORRECTION

PATENT NO. : 6,823,066 B1
DATED : November 23, 2004
INVENTOR(S) : Tuttle et al.

It is certified that error appears in the above-identified patent and that said Letters Patent is hereby corrected as shown below:

Column 14,
Line 42, delete "hoolswitch," and insert -- hookswitch --.
Line 44, delete "transistion," and insert -- transition --.

Column 15,
Line 11, delete "currents," and insert -- current --.

Column 16,
Line 38, delete "fine," and insert -- line --.

Signed and Sealed this

Eighth Day of February, 2005

JON W. DUDAS
*Director of the United States Patent and Trademark Office*